United States Patent [19]

Cheng

[11] 4,061,859

[45] Dec. 6, 1977

[54] VISCOSITY REDUCTION OF CELLULOSE DERIVATIVES

[75] Inventor: Wen-Jiu Cheng, Midland, Mich.

[73] Assignee: The Dow Chemical Company, Midland, Mich.

[21] Appl. No.: 695,876

[22] Filed: June 14, 1976

[51] Int. Cl.$^2$ ............................ C08B 3/22; C08B 3/24; C08B 11/20
[52] U.S. Cl. ........................................ 536/88; 127/37; 536/58; 536/80; 536/82; 536/89
[58] Field of Search ........................ 536/88, 89, 87, 83, 536/80, 82, 58; 127/37

[56] References Cited

U.S. PATENT DOCUMENTS

| | | | |
|---|---|---|---|
| 1,600,159 | 9/1926 | Zdanowich | 536/83 |
| 1,864,554 | 6/1932 | Reid | 536/88 |
| 1,878,988 | 9/1932 | Sheppard | 536/83 |
| 1,904,406 | 4/1933 | Callahan | 536/88 |
| 1,946,645 | 2/1934 | Staud et al. | 536/82 |
| 2,159,377 | 5/1939 | Freeman et al. | 536/88 |
| 2,553,725 | 5/1951 | Rogers et al. | 536/88 |
| 3,391,135 | 7/1968 | Ouno et al. | 536/88 |
| 3,549,617 | 12/1970 | Whitmeyer | 536/89 |

*Primary Examiner*—Ronald W. Griffin
*Attorney, Agent, or Firm*—David B. Kellom

[57] ABSTRACT

In the method of making low molecular weight cellulose ethers and esters by contacting such ethers or esters of higher molecular weight with HCl or other hydrogen halide gas, yellowing of the depolymerized or degraded product is inhibited by treating the dry material with $SO_2$ at about ambient temperature. Residual acid in the product can be neutralized conveniently by treatment with a weak base such as ammonia or sodium bicarbonate. The low molecular weight-low viscosity product is useful in detergent compositions and in coatings for medical pills and capsules.

10 Claims, No Drawings

VISCOSITY REDUCTION OF CELLULOSE DERIVATIVES

BACKGROUND OF THE INVENTION

It has long been known that cellulose derivatives of relatively high molecular weight are readily depolymerized or degraded by treatment with strong mineral acid at moderate temperatures to produce corresponding polymers of much lower molecular weight. Cellulose derivatives such as lower alkyl and hydroxy lower alkyl ethers, for example, methyl cellulose, ethyl cellulose, hydroxypropyl cellulose, and methyl hydroxybutyl cellulose, cellulose esters such as the acetate and butyrate, and methyl hydroxylpropyl cellulose phthalate, carboxyalkyl cellulose such as carboxymethyl cellulose, and other such derivatives having two or more of such substituents on the cellulose molecule are representative examples of the class. The derivatives of relatively low molecular weight are of interest particularly because of their higher solubility in water which makes them useful as modifiers in detergent compositions and as water-dispersible films for coating medical tablets and like applications.

This kind of acid-promoted degradation or depolymerization is conveniently done by contacting the essentially dry powdered cellulosic polymer with gaseous HCl or other hydrogen halide in a fluidized bed operation, for example, or by contacting the powder or slurry of the powder in an inert organic liquid with gaseous halide in a mixing device such as a rotating mixer, ribbon blender, or the like. For the slurry type of depolymerization, a relatively low boiling inert and essentially anhydrous organic liquid with boiling point below 100° C is preferred. Since the cellulosic polymers are essentially insoluble in common organic solvents, substantially any such solvent can be used, for example, methylene chloride, methanol, 1,1,1-trichloroethane, carbon tetrachloride, acetone, hexane, and benzene. In any of these modes of depolymerization, a moderate temperature from ambient temperature to about 80° C is suitable.

Residual acid in the polymer product can be removed by purging the dry powder or a slurry of the powder with air or nitrogen or by washing the powder with an organic solvent such as described above. The last traces of acid can be removed by neutralization with a weak base. A dry, essentially pure product with no need for further processing for many applications is thereby provided.

Hydrogen halide initiated depolymerizations of the kind described are disclosed by Reid, U.S. Pat. No. 1,864,554 and by Ouno, U.S. Pat. No. 3,391,135.

Unfortunately, the low molecular weight polymers made by these processes typically develop a yellow or brown color and so are undesirable for many applications.

It is known that high molecular weight cellulose ethers and esters can be bleached or brightened by stirring a slurry of the cellulosic polymer in aqueous lower alkanol containing dissolved bisulfite ion. This process is described by Whitmeyer in U.S. Patent 3,549,617. Although the brightening treatment disclosed in that patent is effective for the higher molecular weight ethers and esters described therein which are insoluble in aqueous alkanol, the corresponding low molecular weight polymers produced by HCl-initiated depolymerization are much more affected by the presence of significant quantities of water and form unmanageable gels or actually dissolve when slurried in aqueous alkanol as described by Whitmeyer.

SUMMARY OF THE INVENTION

It has been discovered that $SO_2$ can be used to bleach or brighten these low molecular weight cellulosic polymers in the absence of an aqueous medium. It has now been found that in the process for making a low molecular weight cellulosic polymer by contacting the powdered, essentially dry polymer of relatively high molecular weight with hydrogen halide at moderate temperature as described above, yellowing of the low molecular weight product is inhibited or substantially prevented by contacting the product as an essentially dry material with gaseous $SO_2$ at about ambient temperature. The improvement is conveniently obtained by admitting $SO_2$ gas to a depolymerization reactor as a second process step after the hydrogen halide-initiated depolymerization. Hydrogen chloride is of course the preferred halide for the depolymerization step.

DETAILED DESCRIPTION

The quantity of $SO_2$ used in this improvement is not critical because any significant proportion will have an anti-yellowing effect. In most cases, about 0.05–2 percent $SO_2$ based on the weight of polymer is sufficient and 0.08–0.2 percent $SO_2$ is usually sufficient. The prevailing room or outside temperature is satisfactory for the $SO_2$ treatment, i.e., about 15°–40° C, although temperatures somewhat below or above this range can be used.

The $SO_2$ treatment of the essentially dry, HCl-depolymerized polymer is preferably done in the same way as described above for the depolymerization process, that is, by contacting the dry free-flowing powder with $SO_2$ in a fluidized bed apparatus or by contacting the dry powder or slurry of the powder in a dry organic solvent with $SO_2$ in a rotating mixer, a ribbon blender, or other such mixing device. Suitable organic solvents for a slurry treatment process are listed above in the description of the depolymerization process. Treatment of the dry, finely divided powder in a fluidized bed is preferred.

The cellulosic polymers to which the improved process is applicable are those known to the art as cited and enumerated above, that is, the alkyl ethers, hydroxyalkyl ethers, carboxyalkyl ethers, and the esters of low to ultra-low molecular weight, e.g., those polymers which have a 2 percent aqueous solution viscosity below about 100 cps at 20° C, particularly those having a 2 percent viscosity below 10 cps. Normally these polymers contain from trace amounts up to about 5 percent of moisture although their appearance is that of essentially dry solids. Polymers containing about 0.01–5 percent by weight water, are operable in the process but preferably the moisture content is limited to a maximum of about 3 percent.

Residual HCl or $SO_2$ can be removed from the treated polymer powder by any convenient means as previously described, that is, blowing with air or nitrogen, or by washing with a dry low boiling organic liquid such as methanol, methylene chloride, acetone, or other such common organic solvent previously described as suitable for treatment of the powdered cellulosic polymer as a slurry. In order to remove the last traces of acid, it is usually necessary to contact the product polymer with a weak base, preferably by blowing dry $NH_3$ through the reactor, or blending the powder or slurry with dry sodium bicarbonate.

By this improved process, cellulosic polymers of relatively high molecular weight, for example, methyl cellulose and hydroxy lower alkyl methyl cellulose, having a 2 percent water solution viscosity as high as several hundred thousand centipoises at 20° C can be transformed to the corresponding polymers as stable low color powders having a 2 percent aqueous solution viscosity below 100 cps at 20° C. Since the problem of color in the product becomes more severe as polymers are degraded to lower molecular weights, this improved process is of most value in the production of ultra-low molecular weight products. The $SO_2$-treated polymer dissolves in water at a significantly faster rate, a substantial advantage over the untreated material in many applications.

EXAMPLE 1

Into a one-liter glass flask equipped with a ground joint and stopcock was charged 102 g of hydroxybutyl methyl cellulose (2 percent aqueous solution viscosity = 14700 cps in Ubbelohde viscometer at 20° C, salt = 0.41 percent, moisture = 2.3 percent). The flask was connected to a conventional vacuum line, and was evacuated to 4 mm Hg. Hydrogen chloride was expanded into the flask from a one-liter storage flask having 540 mm Hg of HCl at 22° C. The gas transfer was stopped when HCl pressure in the storage flask reached 71 mm Hg. The amount of HCl introduced to the flask was calculated to be 0.9 percent by weight of the cellulose ether.

The flask containing cellulose ether and HCl was isolated from the vacuum line, and rotated by an electric motor at ambient temperature. The flask was opened after 70 hours of degradation in vacuo at 22° C. Titration of the cellulose ether showed that it contained 0.8 percent HCl and 1.84 percent salt. The cellulose ether was poured onto a 100-mesh screen and was purged with nitrogen for one hour at ambient temperature. Titration of sample showed that it contained 0.09 percent HCl, 0.7 percent salt and 0.4 percent moisture. About 15 g of the purged cellulose ether was put into an 8-ounce bottle, and was neutralized with excess ammonia gas.

The bulk of the purged cellulose ether (78 g) was placed into another one-liter glass flask, connected to the vacuum line, and evacuated to 4 mm Hg. Sulfur dioxide gas was introduced to the cellulose ether in a manner similar to that described earlier for HCl, i.e., 107 mm Hg of $SO_2$ gas was transferred from a one-liter storage flask at 22° C to the cellulose ether. The amount of $SO_2$ was calculated to be 0.48 percent (by weight). The flask was rotated for 4 hours, opened, and contacted with ammonia gas to neutralize residual acid. Analysis of the sample showed 0.7 percent salt as NaCl, 0.4 percent moisture, 2 percent viscosity = 22.8 cps, and an APHA color rating of 10. The degraded cellulose ether without $SO_2$ treatment had an APHA color rating of 50.

EXAMPLE 2

Using the procedure of Example 1, 100 g of methyl cellulose (2 percent viscosity = 3260 cps, salt = 0.38 percent, moisture = 3.5 percent) was contacted with 2.16 percent HCl gas (calculated from pressure and volume data). The flask was then equilibrated with nitrogen to atmospheric pressure, and degraded in an oven maintained at 50° C for 72 hours. The flask was evacuated at 6 mm Hg for 2 hours, then opened to air for sampling. Titration showed the cellulose ether contained 0.92 percent residual HCl. About 35 g of the degraded cellulose ether was neutralized with excess ammonia gas. The bulk of the degraded cellulose ether (58 g) was put into another one-liter flask, evacuated, and contacted with 0.69 percent by weight of sulfur dioxide gas. The flask was rotated for 4 hours at room temperature and then residual $SO_2$ was neutralized with excess ammonia gas. Analysis of the product showed: salt (as NaCl) = 1.6 percent, moisture = 2.6 percent, 2 percent viscosity = 1.44 cps. A 0.25 percent aqueous solution had an APHA color of 125. A 0.25 percent solution of the degraded cellulose ether without sulfur dioxide treatment showed an APHA color of over 200.

EXAMPLE 3

A quantity of 7810 g of finely ground (99 percent passed through a #40 U.S. standard sieve) hydroxypropyl methylcellulose containing about 2 percent moisture was loaded into a vertical Plexiglas plastic column (30 cm diameter × 152 cm height) with a perforated Teflon plate at the bottom and connected to a blower and heat exchanger for controlled fluidized bed operation. The column was flushed with nitrogen to remove air and was heated to 54° C. Gaseous HCl was then introduced into the bottom of the column and was passed up through the fluidized bed of hydroxypropyl methylcellulose (HPMC) for 25 minutes at 54°-63.5° C at an average rate of 6 g/minute. The temperature was maintained at 59°-63.5° C for an additional 108 minutes to facilitate degradation. During operation, entrained solids were separated from effluent and both solids and gas were recycled to the reactor.

A large part of the HCl was removed from the treated HPMC by blowing nitrogen through the fluidized bed at 60.5°-68.5° C for 1.5 hours, thereby reducing the HCl content to 0.27 percent from the original 0.93 percent. The nitrogen-flushed bed was then cooled to 32° C and 15 g of $SO_2$ was passed through the bed at a rate of about 5 g/minute.

In order to neutralize residual acids in the treated HPMC, 14 g of $NH_3$ was then passed into the bed of powder. Excess $NH_3$ was removed by blowing with nitrogen and the product was removed from the column. It was found that the viscosity (in 2 percent aqueous solution at 20° C) of the product had been reduced from an original 4,000 cps to 4.31 cps as measured by the Ubbelohde viscometer. The color of the 2 percent solution of treated material was below 25 APHA as compared to >75 APHA color for a similar solution of HCl-degraded material which had not been given the $SO_2$ treatment.

EXAMPLE 4

A two-liter glass reactor flask was charged with about 1150 g of dry acetone. Gaseous HCl was bubbled into the acetone until aliquot titration showed an HCl concentration of 3.6 percent by weight of the solution. The weight of the resulting HCl/acetone solution was 1135 g. The reactor was then equipped with a stirrer, a reflux condenser, and thermocouples. One hundred grams of hydroxypropyl methyl cellulose (2 percent viscosity = 12500 cps, salt = 1.08 percent, moisture = 3.0 percent) was charged into the HCl/acetone solution. Concentration of HCl to cellulose ether was calculated to be 41 percent by weight. The reactor was heated with an electrical heating mantle to 56° C in 30 minutes and the contents were stirred at that temperature for one hour and 40 minutes. The slurry was filtered and washed with excess acetone. A sample of 36 g of the filter cake was taken, stirred into about 100 cc of acetone, and neutralized with sodium bicarbonate. The rest of the filter cake was stirred into 945 g of acetone containing 0.13 percent of $SO_2$. The slurry was stirred for one hour at ambient temperature. Sodium bicarbonate powder, 0.029 g, was charged into the slurry, and the slurry was kept stirred for one hour at ambient temperature. The slurry was then filtered, washed with excess acetone, and air-dried. Product analysis showed:

2 percent viscosity = 2.47 cps
volatile = 2.8 percent
salt (as NaCl) = 2.05 percent
APHA color of 2 percent solution = 10

The product without $SO_2$ treatment had an APHA color rating of between 25 and 50.

EXAMPLE 5

A four cubic foot capacity, nickel clad stationary reactor was equipped with a water jacket, a horizontally rotated paddle agitator and other usual accessories. Into the reactor was loaded 22700 parts of powdered hydroxypropyl methyl cellulose (2 percent viscosity = 4140 cps, salt = 0.6 percent, moisture = 3 percent). The agitator was rotated at about 20 rpm, and the content was heated to 60° C by circulating hot water. The reactor was evacuated to 63 mm Hg, and 170 parts of HCl gas was added rapidly (0.75 percent by weight to cellulose ether). The reactor temperature rose to 72° C briefly due to the exothermicity of gas absorption, but was returned to 60° C after 20 minutes. The reactor was agitated at jacket temperature of 60° C for a total of 5½ hours, then evacuated to 70 mm Hg for one hour to remove HCl. A small sample was taken from the reactor under nitrogen blanket, and was neutralized with excess $NH_3$ gas. The reactor was evacuated to 70 mm Hg, and 30 parts of $SO_2$ gas was added (0.13 percent by weight to cellulose ether). The reactor was cooled to ambient temperature in 30 minutes, and 45 parts of $NH_3$ gas was added (0.2 percent by weight to cellulose ether). After agitating the contents for 10 minutes, the excess $NH_3$ gas was removed by evacuation, and the finished product packaged. The degraded or depolymerized cellulose ether showed:

| | | |
|---|---|---|
| 2 percent viscosity (at 20° C, Ubbelohde) | 3.5 | cps |
| Moisture | 1.9 | percent |
| Salt (as NaCl) | 1.16 | percent |
| APHA Color on 2 percent solution | 75 | |

A 2 percent solution of product without $SO_2$ treatment has an APHA color rating of 125.

I claim:

1. In the process wherein a cellulosic ether or ester is contacted as an essentially dry powder with hydrogen halide at about ambient to 80° C and is thereby converted to a corresponding ether or ester of substantially lower molecular weight, the improvement wherein the lower molecular weight product is contacted as an essentially dry powder with $SO_2$ gas at about ambient temperature, thereby inhibiting yellowing of said product.

2. The process of claim 1 wherein the hydrogen halide is HCl.

3. The process of claim 2 wherein a fluidized bed of the lower molecular weight product is contacted with $SO_2$ gas.

4. The process of claim 2 wherein a slurry of the lower molecular weight product in a low boiling essentially anhydrous organic liquid is contacted with $SO_2$.

5. The process of claim 2 wherein the lower molecular weight product is contacted with $SO_2$ gas as an essentially dry powder in a mechanically stirred mixing device.

6. The process of claim 1 wherein about 0.05-2 percent $SO_2$ is used based on the weight of product and the temperature is about 15°-40° C.

7. The process of claim 1 wherein the $SO_2$ treated powder is contacted with $NH_3$ gas in a quantity sufficient to neutralize essentially all residual acid present.

8. The process of claim 1 wherein the $SO_2$ treated powder is blended with $NaHCO_3$ in a quantity sufficient to neutralize essentially all residual acid present.

9. The process of claim 8 wherein $NaHCO_3$ is blended with the $SO_2$ treated powder as a slurry in a low boiling organic liquid.

10. The process of claim 1 wherein the low molecular weight product is a cellulose ether having a 2 percent aqueous solution viscosity below about 100 cps at 20° C.

* * * * *